United States Patent [19]

Davlin

[11] 4,009,865
[45] Mar. 1, 1977

[54] REGULATING FLOW

[76] Inventor: Irwin H. Davlin, 714 S. Court St., Opelousas, La. 70570

[22] Filed: Sept. 15, 1975

[21] Appl. No.: 613,280

[52] U.S. Cl. .............................. 251/318; 251/366; 251/333

[51] Int. Cl.² ......................................... F16K 1/10

[58] Field of Search ........... 251/318, 366, 367, 333

[56] References Cited

UNITED STATES PATENTS 2,710,121  6/1955  Rees .............................. 251/366 X

FOREIGN PATENTS OR APPLICATIONS

| | | | |
|---|---|---|---|
| 46,578 | 4/1936 | France | 251/367 |
| 598,350 | 9/1925 | France | 251/366 |
| 566,342 | 12/1932 | Germany | 251/366 |
| 272,069 | 2/1930 | Italy | 251/367 |
| 118,687 | 4/1947 | Sweden | 251/367 |

Primary Examiner—Arnold Rosenthal

[57] ABSTRACT

A valve comprising a body having a straight-through flow passage, a valve head moveable at an acute angle with the downstream end of the passage into and out of the passage, and a valve seat extending about the passage for cooperation with the valve head to adjust the valve over a range from the wide-open to the closed condition, the valve seat approaching the axis of the passage no more closely than does the wall of the narrowest portion of the passage upstream or downstream of the seat, whereby in the wide-open condition, the valve head is removed from the passage, the axis of the passage remains a straight line, and the cross-sectional area of the passage at the position of the seat is no less than it is at the narrowest portion of the passage upstream or downstream of the seat.

1 Claim, 1 Drawing Figure

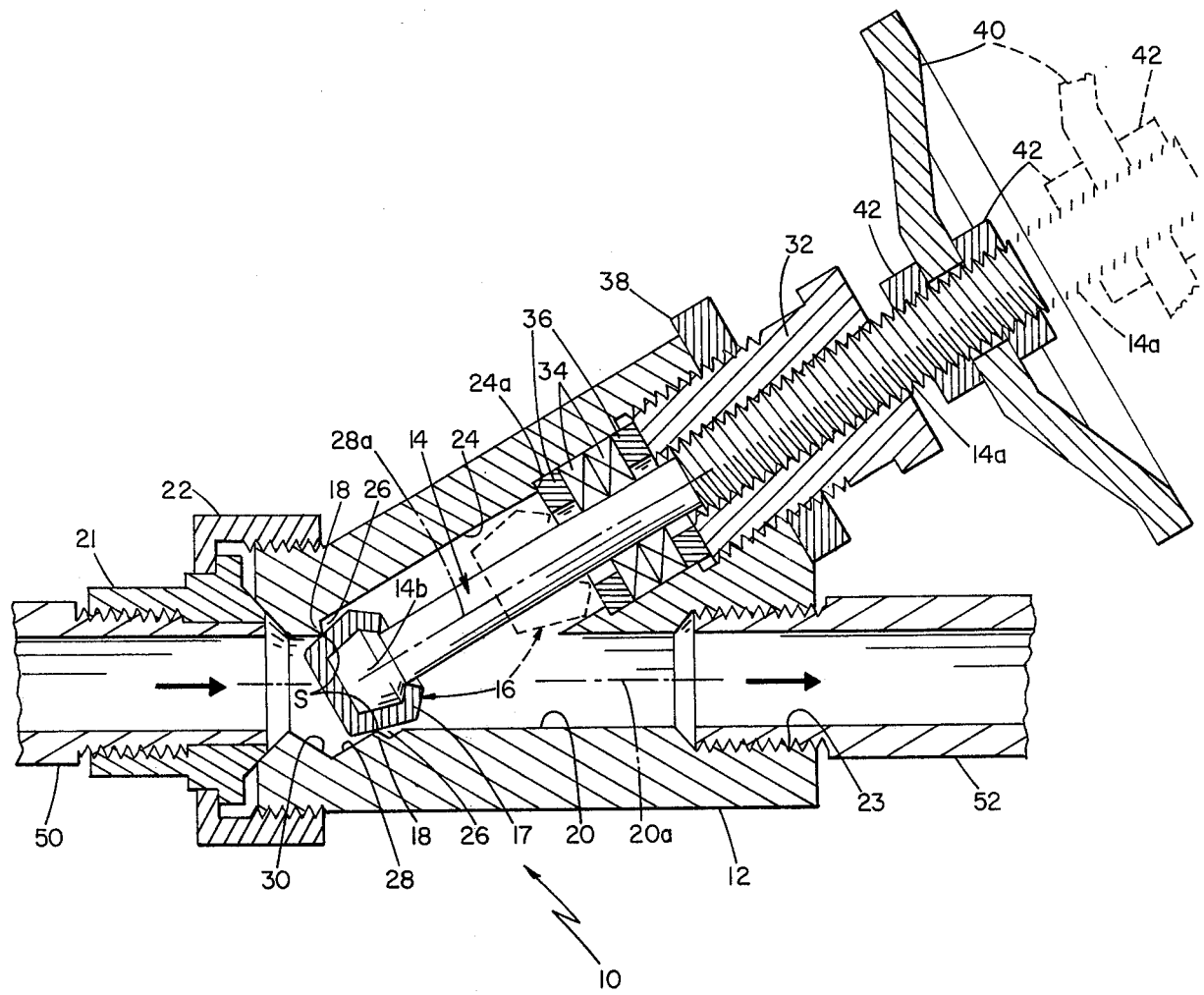

REGULATING FLOW

BACKGROUND OF THE INVENTION

This invention relates to valves.

Straight-through flow is a well-known characteristic of gate valves, which have only two conditions: wide-open and closed. In globe valves, in which flow is variable between those two conditions, in the wide-open condition there is neither straight-through flow nor a seat which does not obtrude into the flow passage to act as a source of friction and turbulence. In McMullen U.S. Pat. No. 2,445,885, flow is generally straight-through, but an angled seat obtrudes into and thereby narrows the flow passage. In Baker et al. U.S. Pat. No. 668,946, the seat and passage diameters are about the same, but the seat and seat support so obtrude into the flow passage that flow must be diverted upward and then downward from its normal straight-line axis. Green U.S. Pat. No. 2,801,820 shows straight-through flow in a valve capable of metering, but the stem is perpendicular to the flow passage, as in a gate valve.

SUMMARY OF THE INVENTION

The invention provides a simple, easy-to-manufacture, versatile, durable, and accurate straight-through valve having relatively few parts.

Since the seat does not obtrude into the flow passage, there is reduced fluid friction and turbulence in the wide-open condition. Because it permits unimpeded straight-through flow in the wide-open condition, the valves of the present invention have advantages of both gate valves and globe valves. Due to their strong though simple construction, the valves function well even under conditions of high fluid temperature and pressure.

The invention is one aspect features a valve comprising a body having a straight-through flow passage, a valve head moveable at a first acute angle with the downstream end of the passage into and out of the passage, and a valve seat extending about the passage for cooperation with the valve head to adjust the valve over a range from the wide-open to the closed condition, the valve seat approaching the axis of the passage no more closely than does the wall of the narrowest portion of the passage upstream or downstream of the seat, whereby in the wide-open condition, the valve head is removed from the passage, the axis of the passage remains a straight line, and the cross-sectional area of the passage (perpendicular to the axis) at the position of the seat is no less than it is at the narrowest portion of the passage upstream or downstream of the seat. In another aspect the invention features a method of making a straight-through flow valve capable of metering fluid (operating at intermediate flow rates) passing therethrough, comprising the steps of providing a valve body large enough to contain a flow passage therethrough and to contain a bore guiding a valve stem, the bore entering the flow passage at an acute angle to the flow passage; drilling a first hole into the body short of penetration therethrough, to form a first bore therein; drilling a second hole into the body coaxially with the first bore and shorter than the first bore to form a second bore therein, the second bore having a diameter greater than the first bore, the wall of the first bore intersecting with the bottom of the second bore in a circle defining a valve seat; drilling a third hole through the body at an acute angle to the axis of the first and second bores, the axis of the third hole passing through the center of the valve seat circle and the inside of the wall surrounding the hole being spaced no farther from the axis thereof than is the seat, the third hole forming a flow passage through the body; and placing a valve head into the first and second bores for axial movement therein into and out of contact with the seat, for regulating flow, the head being fully removed from the flow passage in the wide-open condition of the valve. In a preferred embodiment the seat is formed by an annular first recess in the wall of the passage, the plane of the seat being at a second acute angle to the axis of the passage; there is a second recess in the wall of the passage formed upstream of the first recess, the second recess permitting the head to extend through and beyond the seat; the first recess is formed by a first bore extending at the first acute angle into the passage, the bore permitting the stem to pass therethrough; the second recess is formed by a second bore, coaxial with, narrower than, and deeper than the first bore; the wall of the third hole intersects the valve seat circle; sealing means are placed between the stem and body, to prevent fluid leakage therethrough; and the first acute angle is less than 45°, and in the most preferred embodiment is 30°.

Other advantages and features of the invention will be apparent from the description and drawings herein of a preferred embodiment thereof.

BRIEF DESCRIPTION OF THE DRAWING

The single FIGURE is a view in section of one embodiment of the invention.

DESCRIPTION OF THE PREFERRED EMBODIMENT

The figure shows valve 10, which includes body 12, stem 14, valve head 16, and seat 18. Body 12 contains straight-through flow passage 20, having a ½ inch inner diameter, enclosed at its upstream end by internally threaded union 21, held to the main part of body 12 by union nut 22, and enclosed at its downstream end by internally threaded outlet 23. The internal threads serve to interconnect fluid lines 50 and 52. Bore 24 through body 12 extends into passage 20 at 30° to axis 20a of passage 20 along its downstream end, and forms annular groove 26 in body 12 about passage 20, the plane of recess 26 being at a 60° angle to axis 20a along the upstream end of passage 20. A second bore 28, coaxial with bore 24 but having a narrower diameter, extends further into passage 20, forming groove 30 around the lower periphery of passage 20. Bores 24 and 28 form seat 18, which cooperates with valve head 16 to adjust the valve over a range from the wide-open to the closed condition. Stem 14 is axially moveable through bores 24 and 28, and is guided therethrough by bushing 32, internally threaded for cooperation with the upper threaded portion 14a of stem 14. Bushing 32 is also externally threaded for cooperation with the internally threaded counterbored upper portion of bore 24. Positioned between bushing 32 and the shoulder 24a formed by the counterboring are a pair of gaskets 34 sandwiched between a pair of washers 36. Threading of bushing 32 into bore 24 compresses gaskets 34 between washers 36, thereby effecting a seal both between bushing 32 and bore 24 and between stem 14 and bushing 32. Bushing 32 can be tightened further into bore 24 to compensate for packing wear. Jam nut 38 locks bushing 32 into bore 24. Wheel 40, threaded onto the top of stem 14 and held thereonto by nuts 42, transmits rotation to stem 14 with resulting movement of valve head 16 toward or away from seat 18.

Valve head 16 comprises an enlarged tapered end portion 14b of stem 14 and a tapered brass cap 17 snapped thereon. A swivel connection exists between end portion 14b and cap 17. Seat 18 is made of steel, with the result that brass cap 17 is deformed when and where brought into contact with seat 18, to provide a better seal in the valve closed condition, the deformation compensating for component wear after repeated use. The swivel connection prevents rotation of seated cap 17 in response to rotation of end portion 14b, and thus prevents damage to cap 17 from rotation against seat 18.

No part of seat 18 approaches axis 20a more closely than does the wall of the narrowest portion of passage 20 upstream or downstream of the seat.

In constructing valve 10, a steel block having the outer configuration of housing 12 is first provided, this configuration being generally that of a 30°-60°-90° triangle overlaying, along its hypotenuse, a longer rectangle. Bores 24 and 28 and passage 20 are mentally laid out before actual drilling. Bore 28 is formed first by drilling a ⅝ inch diameter hole 2⅞ inches deep into the block along the triangle leg between the 60° and 90° ends and parallel to the other leg. Bore 24 is then formed by drilling a ¾ inch diameter hole 2 17/32 inches deep into the block coaxially with bore 28 (both bores having axis 28a). Circular seat 18 is formed at the bottom of bore 24 where it narrows into bore 28. Bore 24 is then counterbored, to a diameter of ⅞ inch and 1⅞ inches deep to provide annular shoulder 24a. This counterbored portion is then tapped ⅝ inch deep to provide a female threaded connection for bushing 32. Passage 20 is then formed by drilling a ½ inch diameter hole straight through the block 30° to axis 28a and axially coplanar with bores 24 and 28, with the walls of the hole intersecting bores 24 and 28 along the circle containing points S,S and defined by the intersection of bores 24 and 28, and the axis of the passage passing through the center of the circle containing points S,S. Passage 20 has grooves 26 and 30 formed in its walls as a result of the drillings for bores 24 and 28, respectively. The end of passage 20 adjacent seat 18 is countersunk, and the corresponding exterior end of body 12 is threaded. Union 21 is inserted into the countersunk portion of passage 20 and held thereto by union nut 22 threaded onto the threaded end of body 12. Passage 20 is tapped at its opposite (downstream) end, threadably to receive a fluid line. Stem 14, with cap 17 snapped onto end portion 14b, is inserted into bore 24 with head 16 seated against seat 18 as shown in the figure. Washer 36 is placed onto stem 14, and pushed into place abutting shoulder 24a, followed by gaskets 34 and finally by a second washer 36. Bushing 32 is then threaded onto stem 14 and into body 12 until it depresses upper washer 36 against the gaskets and lower washer 36 to compress the gaskets, thereby effecting the seal. Jam nut 38 is then threaded onto bushing 32 to lock the bushing in place. Wheel 42 is then attached to the threaded end 14a of stem 14 by nuts 42.

In operation, fluid lines 50 and 52 are connected into opposite ends of valve 10, and wheel 40 is rotated to vary flow of fluid through valve 10. In the closed condition of valve 10, cap 17 extends beyond seat 18 into groove 30. In the wide-open condition of valve 10 (shown in broken lines by the position of valve head 16), valve head 16 is removed from passage 20, the axis 20a of passage 20 remains a straight line, and the cross-sectional area of passage 20 at the position of seat 18 is no less than it is at the narrowest portion of passage 20 upstream or downstream of seat 18.

Other embodiments within the invention will be apparent to those skilled in the art.

What is claimed is:

1. A valve comprising:
    a body having a straight-through flow passage,
        said passage having a longitudinal axis therethrough and a cross-sectional area perpendicular to said axis,
    a valve head moveable at a first acute angle with the downstream end of said passage into and out of said passage, and
    a valve seat extending about said passage for cooperation with said valve head to adjust said valve over a range from the wide-open to the closed condition,
        said valve seat approaching said axis of said passage no more closely than does the wall of the narrowest portion of said passage upstream or downstream of said seat,
        said seat being formed by an annular first recess in the wall of said passage, the plane of said recess being at a second acute angle to said axis of said passage,
        said first recess being formed by a first bore extending at said first acute angle into said passage, said bore permitting said valve head to pass therethrough,
        said wall of said passage having a second recess therein formed upstream of said first recess, said second recess permitting said valve head to extend through and beyond said seat,
        said second recess being formed by a second bore, coaxial with said first bore, narrower than said first bore, and deeper than said first bore,
    whereby in said wide-open condition, said valve head is removed from said passage, said axis of said passage remains a straight line, and said cross-sectional area of said passage at the position of said seat is no less than it is at the narrowest portion of said passage upstream or downstream of said seat.

* * * * *